United States Patent
Wiemer et al.

(10) Patent No.: US 9,474,287 B2
(45) Date of Patent: Oct. 25, 2016

(54) SEPARATION DEVICE

(75) Inventors: Peter Wiemer, Meerbusch (DE);
Günter Kessler, Frankfurt am Main (DE)

(73) Assignee: Poly-clip System GmbH & Co. KG, Hattersheim (DE)

(*) Notice: Subject to any disclaimer, the term of this patent is extended or adjusted under 35 U.S.C. 154(b) by 173 days.

(21) Appl. No.: 13/102,894

(22) Filed: May 6, 2011

(65) Prior Publication Data

US 2011/0272425 A1  Nov. 10, 2011

(30) Foreign Application Priority Data

May 6, 2010 (EP) .................................... 10004816

(51) Int. Cl.
| | | |
|---|---|---|
| *A24F 15/04* | (2006.01) | |
| *G07F 11/16* | (2006.01) | |
| *A22C 15/00* | (2006.01) | |
| *A47G 21/12* | (2006.01) | |
| *B65G 47/14* | (2006.01) | |

(52) U.S. Cl.
CPC ............. *A22C 15/001* (2013.01); *A47G 21/12* (2013.01); *B65G 47/1478* (2013.01); *B65G 2201/0217* (2013.01)

(58) Field of Classification Search
CPC ....... B65D 83/02; B65G 47/06; B23Q 41/02
USPC ........... 221/1, 174, 201, 257, 164, 142, 254; 414/748, 900, 745
See application file for complete search history.

(56) References Cited

U.S. PATENT DOCUMENTS

| | | | | |
|---|---|---|---|---|
| 488,084 A | * | 12/1892 | Miner ................. | B65G 59/067 221/175 |
| 541,853 A | * | 7/1895 | Hart ...................... | A24F 15/10 221/142 |
| 1,159,195 A | * | 11/1915 | Eden .................... | B65G 59/067 221/238 |
| 1,457,050 A | * | 5/1923 | Abbaticchio .......... | A24F 27/22 221/254 |
| 1,498,476 A | * | 6/1924 | Nadwocki ............. | A47F 1/06 221/248 |
| 1,696,787 A | * | 12/1928 | Zelkowitz ............. | A24F 15/04 221/254 |

(Continued)

FOREIGN PATENT DOCUMENTS

| | | |
|---|---|---|
| DE | 39 30 876 C1 | 7/1990 |
| EP | 2 070 846 A1 | 6/2009 |

(Continued)

OTHER PUBLICATIONS

Computer translation of FR 2.183.200 from European Patent Office website, 3 pgs, Oct. 21, 2011.

(Continued)

*Primary Examiner* — Rakesh Kumar
(74) *Attorney, Agent, or Firm* — Fitch, Even, Tabin & Flannery LLP

(57) ABSTRACT

The present invention concerns a separation device for separating a rod-like element from a plurality of rod-like elements stored in a storage. The separation device may include a storage space having an approximately V-shaped cross section, for storing a plurality of at least approximately horizontally aligned rod-like elements, wherein the storage space includes at least a front wall element, a rear wall elements, and two side wall elements, having a bottom section and a top section. Moreover, a first discharge unit may be included for discharging a single rod-like element out of the plurality of rod-like elements stored in the storage space.

15 Claims, 4 Drawing Sheets

(56) References Cited

U.S. PATENT DOCUMENTS

| | | | | |
|---|---|---|---|---|
| 2,346,863 A * | 4/1944 | Pacione | A24F 15/04 | 221/131 |
| 2,407,638 A * | 9/1946 | Gettig | B65G 47/1478 | 221/236 |
| 2,541,945 A * | 2/1951 | Smith | A24F 15/04 | 221/254 |
| 3,232,449 A * | 2/1966 | Shen | B21B 39/002 | 414/746.1 |
| 3,703,232 A * | 11/1972 | Zbiegien | B65G 47/1478 | 198/383 |
| 3,743,135 A * | 7/1973 | Brumley | G07F 11/44 | 221/205 |
| 3,746,212 A * | 7/1973 | Anderheggen | B65G 47/1407 | 198/540 |
| 3,777,932 A * | 12/1973 | Matsui | B65G 65/42 | 221/204 |
| 4,362,460 A * | 12/1982 | Peddinghaus | B65G 47/1478 | 198/443 |
| 4,388,039 A * | 6/1983 | Schwarze | B21D 43/006 | 198/543 |
| 4,548,537 A * | 10/1985 | Kubotera | B21F 23/007 | 221/210 |
| 4,573,860 A * | 3/1986 | Peddinghaus | B65G 47/1478 | 198/443 |
| 4,809,882 A * | 3/1989 | Neu | B65G 47/1478 | 221/238 |
| 4,946,024 A * | 8/1990 | Forsberg | B65G 47/82 | 198/429 |
| 4,982,891 A * | 1/1991 | Kimura | B21D 11/10 | 228/155 |
| 5,067,631 A * | 11/1991 | Baba | B65G 47/1478 | 221/254 |
| 5,238,353 A * | 8/1993 | Kollross | A22C 15/001 | 198/803.14 |
| 5,592,898 A * | 1/1997 | Korpi | E01F 9/688 | 116/202 |
| 5,647,472 A * | 7/1997 | Fierkens | B65G 47/1471 | 198/443 |
| 5,899,357 A * | 5/1999 | Yuyama | B65B 35/08 | 221/171 |
| 5,911,803 A * | 6/1999 | Miyano | 82/1.11 | |
| 6,039,209 A * | 3/2000 | Yuyama | B65G 47/1478 | 221/171 |
| 6,138,868 A * | 10/2000 | Yuyama | G07F 17/0092 | 221/156 |
| 6,189,728 B1 * | 2/2001 | Yuyama | B65G 47/1471 | 221/17 |
| 6,272,955 B1 * | 8/2001 | Scemama | 82/124 | |
| 6,505,756 B1 * | 1/2003 | Walldorf | B65G 47/1478 | 221/241 |
| 6,640,428 B2 * | 11/2003 | Barber | A61M 5/32 | 221/254 |
| 6,860,694 B2 * | 3/2005 | Slettedal | E21B 19/155 | 414/22.51 |
| 7,089,654 B2 * | 8/2006 | Chiba | B23P 19/001 | 221/236 |
| 7,299,943 B2 * | 11/2007 | Itoh | G01N 35/10 | 221/242 |
| 7,504,067 B2 * | 3/2009 | Itoh | B65G 47/1478 | 156/538 |
| 2011/0272425 A1* | 11/2011 | Wiemer | A22C 15/001 | 221/1 |

FOREIGN PATENT DOCUMENTS

| | | |
|---|---|---|
| FR | 2.183.200 A1 | 12/1973 |
| GB | 828305 | 2/1960 |
| GB | 964256 | 7/1964 |

OTHER PUBLICATIONS

DE 39 30 876 C1—English abstract and machine translation obtained from Espacenet (http://worldwide.espacenet.com) accessed on Apr. 20, 2012, 11 pages.

* cited by examiner

SEPARATION DEVICE

This application claims priority to, and the benefit of, European Patent Application No. 10 004 816.4-1260 filed May 6, 2010, which is hereby incorporated by reference.

BACKGROUND OF THE INVENTION

The present invention relates to a separation device according to the preamble of independent claim 1 for separating a rod-like element, like a smoking rod, from a plurality of rod-like elements, like smoking rods, stored in a storage as well as a method according to the preamble of independent claim 14 for separating a rod-like element, like a smoking rod, from a plurality of rod-like elements, like smoking rods, stored in a storage.

In particular, the present invention relates to a separation device for separating a rod-like element, like a smoking rod, from a plurality of rod-like elements, like smoking rods, stored in a storage. The separating device comprises a storage space having an approximately V-shaped cross section, for storing a plurality of at least approximately horizontally aligned rod-like elements. The storage space includes at least a front wall element, a rear wall element and two side wall elements, having a bottom section and a top section and a first opening provided in the upper region of the storage space for at least feeding the plurality of rod-like elements to the storage space from the top section toward the bottom section of the storage space in an approximately vertically downwardly directed feeding direction. Furthermore, invention relates to a method for separating a rod-like element, like a smoking rod, from a plurality of rod-like elements, like smoking rods, stored in a storage space.

In practice, rod-like elements, in particular smoking rods, are used for pendulous storing of sausage-shaped products, like sausages, comprising a hook-like or loop-shaped suspension element. For example, in the production of sausage products, using a clipping machine, a predetermined portion of sausage meat is filled into a tubular or bag-shaped packing casing closed at one end by e.g. a closing clip. After the filling operation is concluded, the tubular casing is closed at the second end by a second closing clip. Together with one of the closing clips, a suspension loop is attached to the sausage product. Thereafter, the sausage product is hung up to a smoking rod provided in a hanging line upstream the clipping machine. After a defined number of sausage products is hung up to said smoking rod, the smoking rod together with the sausage products is moved out off the hanging line and an empty smoking rod is fed to the hanging line.

In order to ensure feeding a single smoking rod to the hanging line, storage devices for storing and feeding smoking rods to a hanging line are used. From German patent 39 30 876, a method and a device for feeding and discharging smoking rods to and from an automatic hanging line are known. The device comprises a magazine for accommodating smoking rods. The magazine has an approximately triangular cross section with one tip facing downwardly and including at least a lower opening positioned at said tip for releasing a single smoking rod. The lower opening may be blocked and unblocked by two blocking levers. Said levers are pivotal arranged in order to allow a single smoking rod to be released out of the magazine via inclined guide bars towards a charging position at which sausages are to be hung up to said smoking rod.

In the known device, the separation of smoking rods has to be established by pivot levers positioned at the respective opening of the magazine. Smoking rods are urged by the force of gravity towards said opening. Depending on the number of smoking rods in the magazine, the smoking rod positioned adjacent to the releasing opening, is burdened by a varying weight of the smoking rods remaining in the magazine. Moreover, in case that the smoking rod positioned adjacent to the releasing opening, is blocked or engaged by a further smoking rod, no smoking rod may be fed to the hanging line, causing additional time and costs.

BRIEF SUMMARY OF THE INVENTION

Thus, it is an object of the present invention to provide a separation device and a method with which the above mentioned drawbacks can be overcome and with which a safe and reliable separation of smoking rods may be assured.

The aforesaid object with respect to the separation device is achieved by the features of claim 1, whereas the aforesaid object with respect to the method is achieved by the features of claim 14. Advantageous configurations of the invention regarding the separation device are defined in claims 2 to 13, and with regard to the system in method 15.

In accordance with the present invention, a separation device is provided for separating a rod-like element, like a smoking rod, from a plurality of rod-like elements, like smoking rods, stored in a storage. The separation device comprises a storage space having an approximately V-shaped cross section, for storing a plurality of at least approximately horizontally aligned rod-like elements. The storage space includes at least a front wall element, a rear wall element and two side wall elements, having a bottom section and a top section. Moreover, the storage space includes a first opening provided in the upper region of the storage space for at least feeding the plurality of rod-like elements to the storage space from the top section toward the bottom section of the storage space in an approximately vertically downwardly directed feeding direction.

In the inventive separation device, a first discharge unit is provided, for discharging a single rod-like element out of the plurality of rod-like elements stored in the storage space, out of the storage space, along a moving path in a discharge direction directed at least approximately opposite to the feeding direction, into a discharge area being located in the upper region of the storage space. While discharging the separated smoking rod to the discharge area being located in the upper region of the storage space by the first discharge unit according to this invention, effective separation may be achieved. Moreover, the discharge of the smoking rod is not affected by the weight of the plurality of smoking rods remaining in the storage space.

In principle, the first opening can be used for feeding and discharging the smoking rods to and from the storage space. In order to allow a separate feeding or discharging of a smoking rod from a discharging or feeding of another smoking rod, it is favorable that a second opening is provided in the upper region of the storage space for at least discharging the rod-like element separated by the first discharge unit. Such a discharge opening in the upper region of the separation device allows further a flexible connection of the separation device to the hanging line and a reduced construction height of the production line including the inventive separation device.

In a further preferred embodiment of the inventive separation device, the second opening is arranged opposite to the first opening. This solution supports that the separated rod-like elements may be discharged from the separation device and, at the same time, further rod-like elements to be separated may be fed to the separation device.

The first discharge unit may comprise at least one telescopic operating device having an upper operating end, which is reversibly vertically movable between a lower and an upper position, thereby separating on its way to the upper position one rod-like element out of the plurality of rod-like elements stored in the storage space. By moving the upper end of the telescopic operating device to its upper position, the separation of a single rod-like element is assured, and a blocking of the separated rod-like element by other rod-like elements is avoided.

Since the rod-like elements are fed to and discharged from the storage space from its upper region, the storage space has a closed lower or bottom portion. To allow the telescopic operating device to separate one rod-like element from the plurality of rod-like elements stored in the storage space, openings in the bottom section of the storage space the storage space are provided through which the telescopic operating device is able to extend.

To ensure the discharge of all rod-like elements stored in the V-shaped storage space, the openings through which the telescopic operating device extends into the storage space are provided at the lowest point in the storage that is at the tip of the V-shaped of the storage.

In order to increase the accuracy of separation and for preventing a separated rod-like element from falling off the telescopic operating device of the first discharge unit, the first discharge unit comprises a second telescopic operating device having an upper operating end which is reversibly vertically movable between a lower and an upper position, thereby separating on its way to the upper position one rod-like element out of the plurality of rod-like elements stored in the storage space.

Each of the first and/or second telescopic operating devices may be realized by various drive elements. In a simple case, said devices include a piston/cylinder drive, wherein both, the piston and the cylinder, may be arranged to reversibly move vertically between a lower and an upper position.

According to the present invention, the separation device comprises at least a first sensor positioned in the region of the upper end of the moving path of the telescopic operating device. Said sensor may sense the presence or absence of a separated rod-like element in the discharge area. The result may be transmitted to a control unit for interacting with the drive of the separation device or the hanging line, respectively.

Furthermore, the separation device comprises at least one positioning unit aligned to the moving path of the upper operating end of the telescopic operating device, for moving the rod-like element held by the telescopic operating device into a predetermined position along its longitudinal axis. Thus, the separated rod-like element may be distributed to an exactly defined transfer position.

Rod-like elements used as smoking rods may have cross sections of various shapes like triangular, round or squared cross sections. In order to allow the separation device to separate all these rod-like elements, adapting elements are attachable to the upper operating end of the first discharge unit in order to be adapted to rod-like elements of various cross sections. To simplify the adaption of the separation device to rod-like elements of various cross sections, the adapting elements may be detachable attached to the upper operating ends of the telescopic operating device.

In a further embodiment of the inventive separation device, there is provided a second discharge unit aligned to the discharge region in the area of the upper region of the storage space, for guiding the separated rod-like element out of the separation device. Thereby, the second discharge unit can provide a coupling of the separation device to a hanging line.

The second discharge unit may be provided with various guide means for guiding the separated rod-like element out of the storage space, in particular to a hanging line. According to a preferred embodiment, the second discharge device comprises two guide rails having first and second ends which are arranged parallel to each other, wherein the first ends of the guide rails are aligned to the upper position of the upper end of the piston. Each of said guide rails of the second discharge unit may include a band or chain conveyor or any other suitable conveying means.

In order to securely deliver the separated rod-like element to the second discharge unit, it is proposed that at least one transfer element is provided at the first ends of the guide rails. Said transfer element may be, for example, composed of a pivotally arranged element like a lever which pivots out of the moving path of the separated rod-like element in its upward movement and pivots back to take over said rod-like element.

Moreover, according to the present invention, there is provided least a second sensor at at least one of the guide rails for sensing the presence of a rod-like element. Said sensor should be coupled to a control unit for interacting with the drive of the separation device or the hanging line, respectively, in case of a jam of rod-like elements on the guide rails.

According to the present invention, there is further provided a method for separating a rod-like element, like a smoking rod, from a plurality of rod-like elements, like smoking rods, stored in a storage space. The method comprises the steps of feeding a plurality of at least approximately horizontally aligned rod-like elements in a downwardly directed and at least approximately vertical feeding direction into a storage space having an approximately V-shaped cross section, and discharging a single rod-like element out of the plurality of rod-like elements stored in the storage space, out of the storage space, along a moving path in a discharge direction directed at least approximately opposite to the feeding direction, into a discharge region in the area of the top region of the storage space by means of a first discharge unit.

Moreover, the method further includes the step of transferring the single rod-like element separated by the first discharge device to a second discharge unit aligned to the discharge region in the area of the top region of the storage space, for discharging the separated rod-like element out of the separation device.

The inventive method for separating a rod-like element from a plurality of rod-like elements provides the same advantages as disclosed in conjunction with the inventive separation device.

Further advantages and a preferred embodiment will be described in the following together with the drawings listed below. The expressions "left", "right", "below" and "above" are referred to the drawings in an alignment such that the reference numbers used can be read in normal.

DETAILED DESCRIPTION OF THE INVENTION

Figure 1:
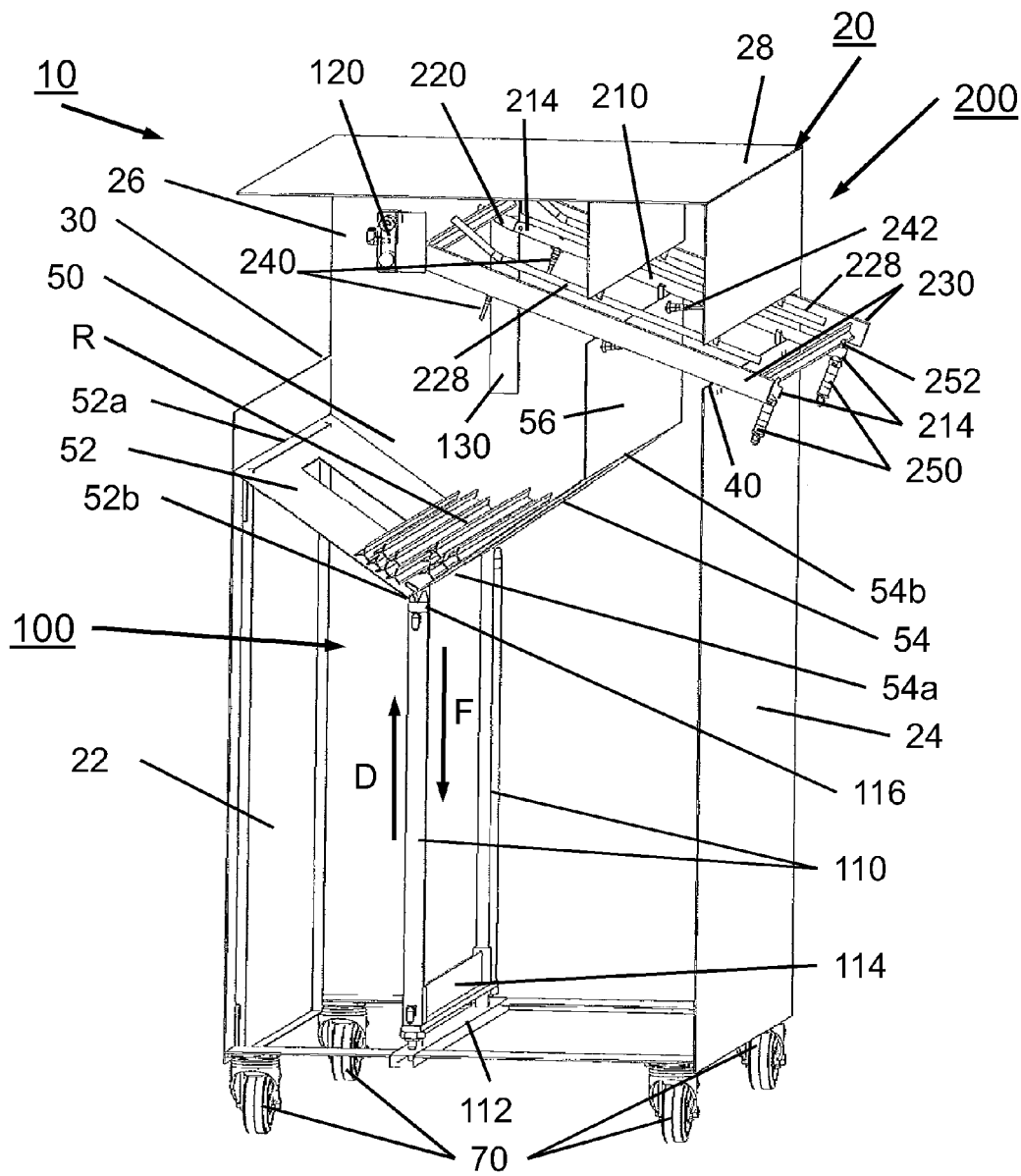
FIG. 1: is a schematic and perspective view of an embodiment of a separation device according to the present invention, with the a discharge unit in the upper position.

FIG. 1 shows a schematic and perspective view of an embodiment of a separation device according to the present invention, with the first discharge unit 100 in the upper position.

The separation device 10 comprises the first discharge unit 100 and a second discharge unit 200. First and second discharge units 100, 200 are accommodated in a common housing 20.

Housing 20 consists of a front wall 22, a rear wall 24, two identical side walls 26 and a top wall 28. For clarification matters, in FIGS. 1 and 2, only one of side walls 26 is shown, namely the rearmost side wall 26. In its upper region, front wall 22 comprises a first squared opening 30. A second opening 40 having a squared shape, is arranged in the upper region of rear wall 24. In FIG. 1, opening 30 in front wall 22 is shown as to be larger than opening 40 in rear wall 24. Naturally, openings 30, 40 may also be of the same size, or opening 40 may be larger than opening 30. Housing 20 further comprises frame elements (not designated in the figures) to which the wall elements are attached, e.g. welded or riveted.

Moreover, a storage space 50 is arranged in the upper region of housing 20, defined by first and second wall elements 52, 54. Wall elements 52, 54 are slopingly arranged to front and rear walls 22, 24, and vertically arranged to side walls 26. First wall element 52 has first and second ends 52a, 52b and is coupled to front wall 22 by its first end 52a. First wall element 52 extends from front wall 22 downwardly into housing 20 and ends in a horizontal distance of approximately one-third of the distance between front wall 22 and rear wall 24. Front wall 22 and first wall element 52 thereby compassing an obtuse angle.

Second wall element 54 has first and second ends 54a, 54b and is coupled to second end 52b of first wall element 52 by its first end 54a. Second wall element 54 extends upwardly towards rear wall 24, thereby first and second wall elements 52, 54 compassing an obtuse angle. First and second wall elements 52, 54 together with the upper parts of side walls 26 define storage space 50 which has a V-shaped cross section for accommodating a plurality of rod-like elements or smoking rods R. The width of storage space 50 which is the distance between side walls 26, is at least a little larger than the length of a smoking rod R. Furthermore, a vertically arranged inner wall element 56 is connected to second end 54b of second wall element 54 with its lower end and to top wall 28 by its upper end. Inner wall element 56 further comprises an opening 56a which corresponds to opening 40 in rear wall 24 of housing 20.

As it can be seen in FIG. 1, first discharge unit 100 includes two vertically and parallel to each other arranged telescopic operating devices 110. Each of said telescopic operating devices 110 is formed by a drive in the form of piston/cylinder arrangement. As it can particularly be seen in FIG. 2, telescopic operating device or piston/cylinder drive 110 includes a piston 110a and a cylinder 110b.

Figure 2:
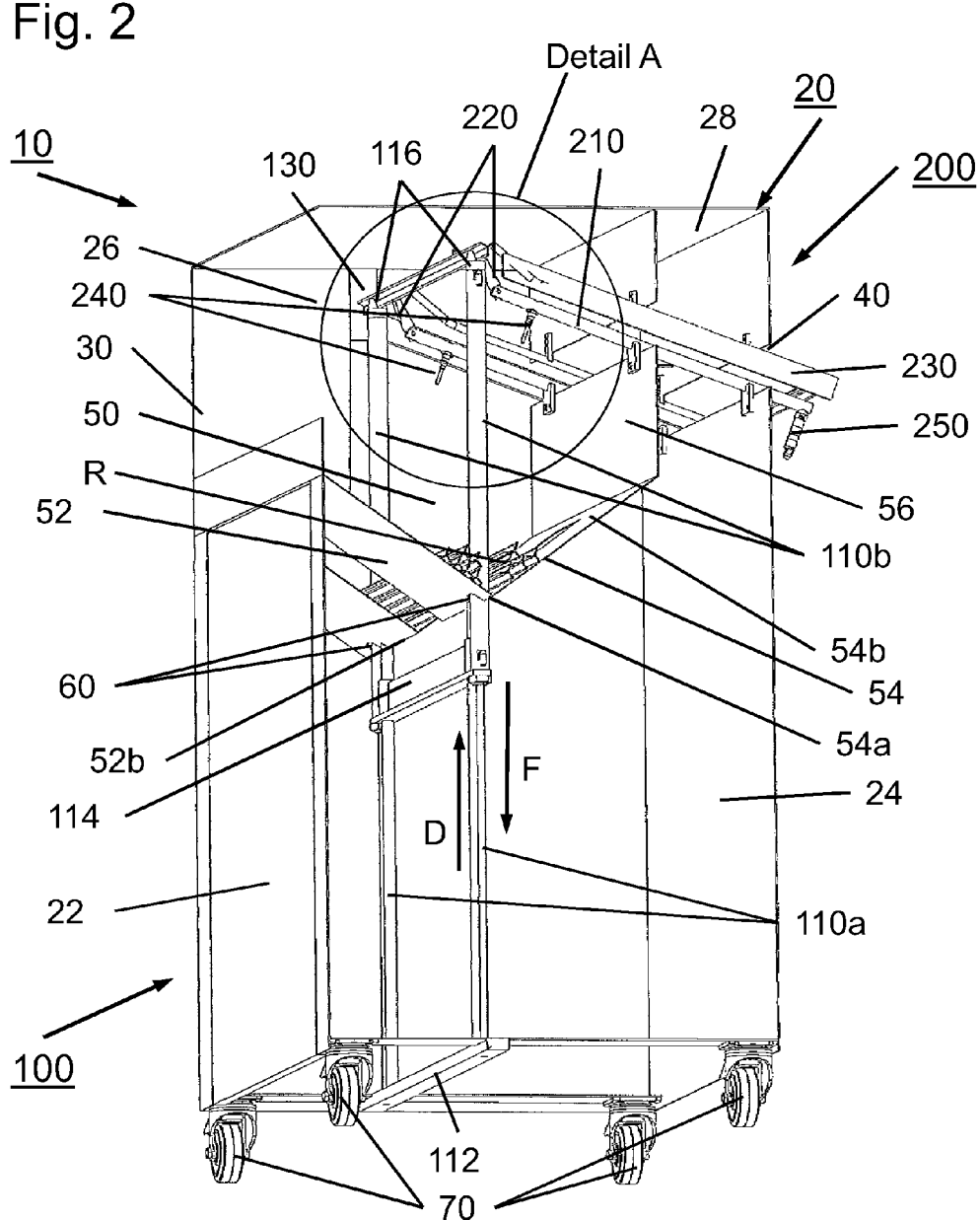
FIG. 2: is a schematic and perspective view of the separation device according to FIG. 1, with the first discharge unit in the lower position.

Piston 110a of both piston/cylinder drives 110 are coupled with their lower ends to a horizontally arranged bar 112, which is vertically and parallel aligned to the lower edge or tip of V-shaped storage space 50, formed by second end 52b of first wall element 52 and first end 54a of second wall element 54. Bar 112 is positioned in a height corresponding to the lower ends of walls 22, 24 and 26 of housing 20. The upper end of piston 110a is accommodated within cylinder 110b, which is vertically, reversibly movable along piston 110a between a lower position as shown in FIG. 1 and an upper position as shown in FIG. 2 in a feeding direction F or a discharge direction D, respectively. A horizontally arranged cross head 114 is coupled by its ends to the lower ends of cylinders 110b; thereby stabilizing piston/cylinder drives 110 while moving between its upper and lower position.

For allowing a vertically movement of piston/cylinder drives 110, the lower edge of V-shaped storage space 50, which is the connection line between first and second wall elements 52, 54, comprises two openings 60 for being engaged by cylinders 110b of piston/cylinder drive 110 when being moved between its upper and lower position.

At the upper operating ends of cylinders 110b, adapter elements 116 are arranged having a shape which corresponds to the cross section of smoking rods R to be separated by separation device 10. By exchanging adapter elements 116, separation device 10 may be adapted to separate smoking rods having various cross sections.

In the region of the upper operating end of one of cylinders 110b when in the upper position, first discharge unit comprises a pusher cylinder 120 acting horizontally on smoking rod R and in the direction of the longitudinal axis of smoking rod R held by the upper operating end of one of cylinders 110b when in the upper position. A second pusher cylinder may be arranged opposite to pusher cylinder 120 for acting on the respective other end of smoking rod R.

Laterally to pusher cylinder 120 and additionally or alternatively thereto, a shifting element 130 is attached to the inner surface of side wall 26. Shifting element 130 is formed by a strip-like plate arranged vertically along the moving path of separated smoking rod when first discharge unit 100 moves from its lower to its upper position. The end of smoking rod R facing shifting element 130 is engaged by shifting element 130. Smoking rod R held by adapter elements 116 is thereby shifted into a predetermined position on adapter elements 116 along its longitudinal axis.

Separation device 10 further comprises second discharge unit 200. Second discharge unit 200 includes two guide rails 210 arranged parallel to each other and to side walls 26 of housing 20. Guide rails 210 have first and second ends 212, 214 and are aligned with their first ends 212 to the upper operating ends of cylinders 110b in their upper position. Second discharge unit 200 is directed towards rear wall 24 in a downward direction. Thereby, second ends 214 of guide rails project through rear wall 24. Second discharge unit is positioned to extend through the opening 56a in inner wall 56 and through opening 40 in rear wall 24.

Figure 3:
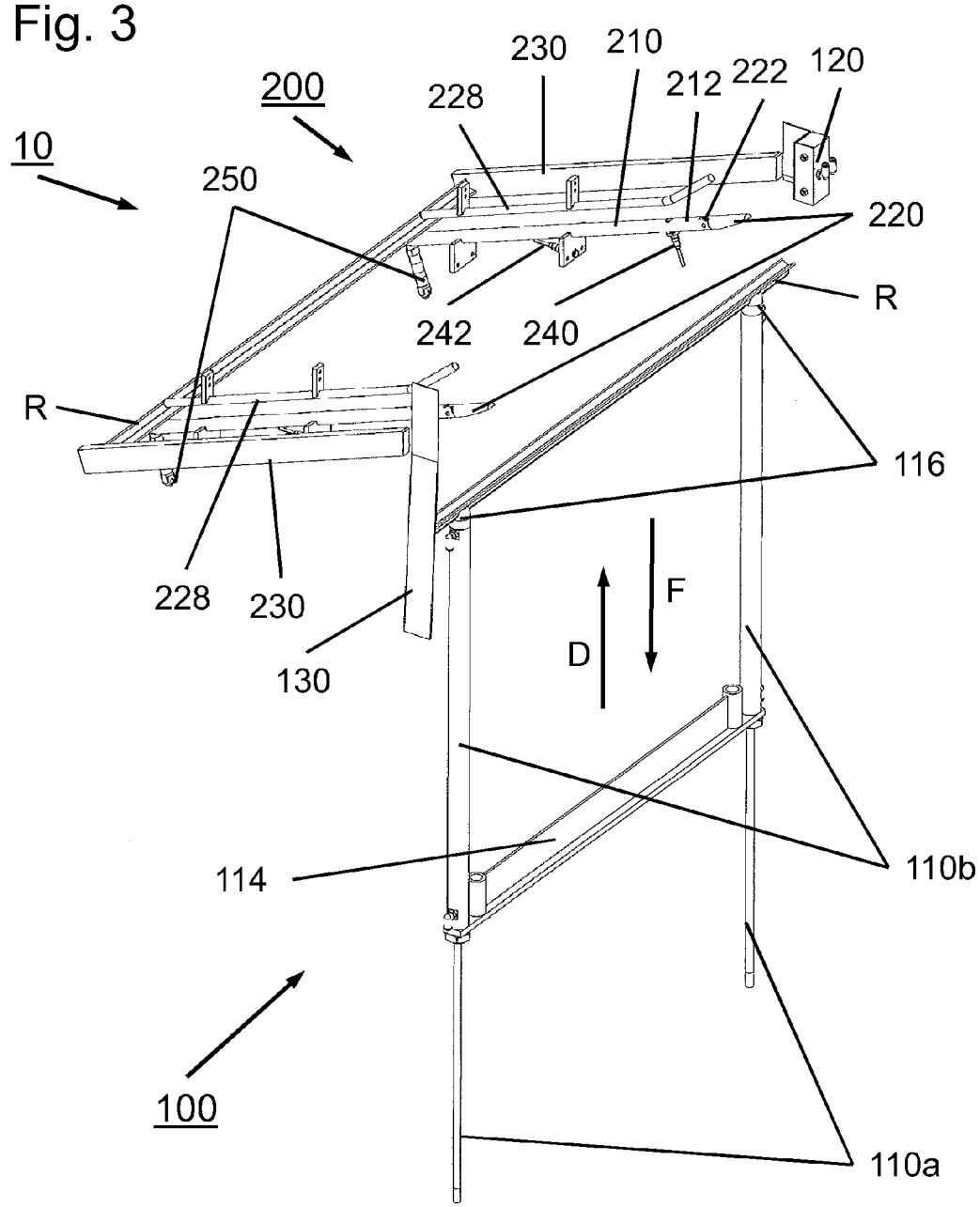
FIG. 3: is a schematic and perspective view of the first and a second discharge unit according to the present invention with the first discharge unit in a position between the upper and lower position.

Referring to FIGS. 2 and 3, at the first ends 212 of guide rails 210, transfer elements 220 are pivotally attached by respective hinges 222. In a standby position, as it is shown in FIG. 3, transfer elements 220 are linearly aligned with guiderails 210. In a transfer position, as it can be seen in FIG. 2, transfer elements are pivoted upwardly to allow a smoking rod R separated by first discharge unit 100 to be bypassed when first discharge unit 100 is in its upper position.

Figure 4:
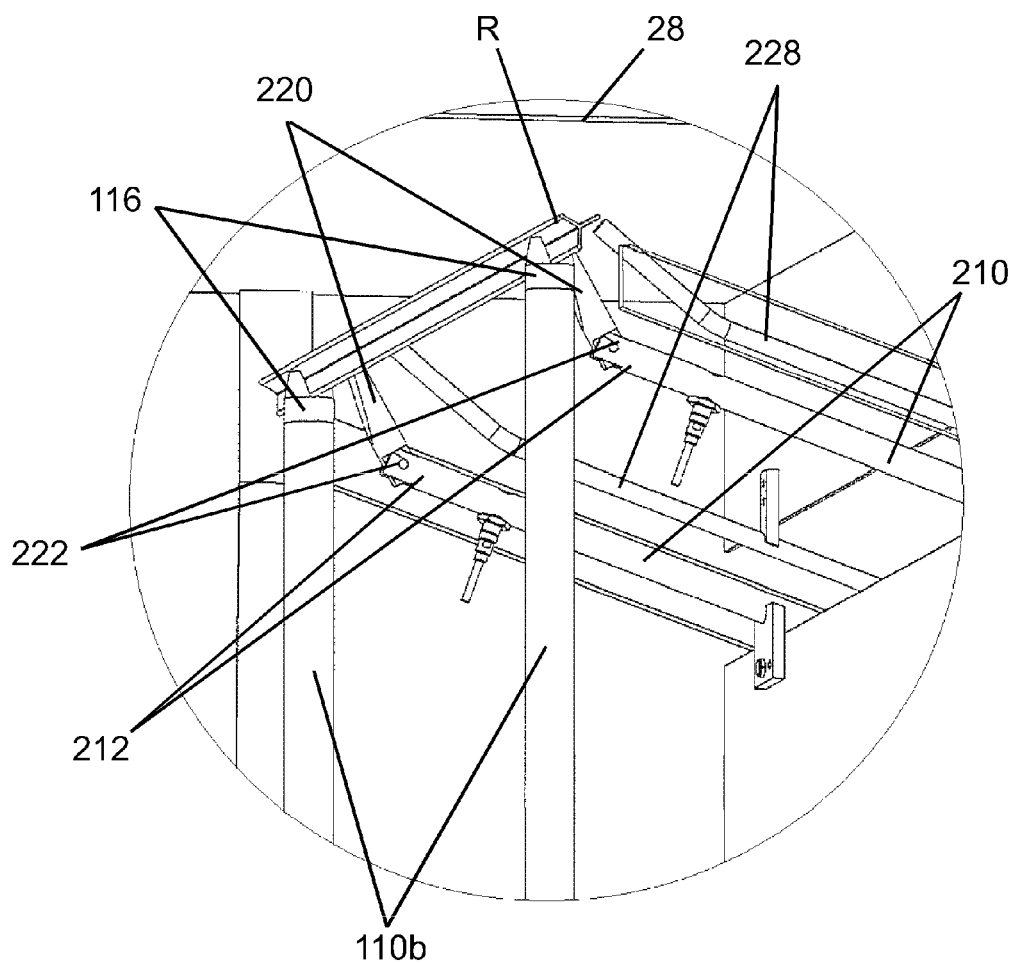
FIG. 4 is an enlarged view of Detail A in FIG. 2.

With reference to the embodiment shown in FIGS. 2-4, above guide rails 210 and parallel thereto, boundary rods 228 are arranged with a distance to guide rails 210 which corresponds to the height of smoking rods R. Boundary rods 228 thereby help guiding smoking rods R along guide rails 210 and from prevent smoking rods R from stapling one upon the other while sliding down guide rails 210.

Second discharge unit 200 further comprises two leading elements 230. Said leading elements 230 are formed by longitudinally strips each of which is attached to one of the inner surfaces of side walls 26, respectively. Leading elements 230 are aligned parallel to and at a height exactly between guide rails 210 and boundary rods 228. The distance between leading elements 230 corresponds to the length of a smoking rod R.

As it further can be seen particularly from FIGS. 2-4, sensors 240, 242 are arranged along guide rails 210. Said sensors 240, 242 may be optical sensors or electrical sensors for sensing the presence or absence of smoking rods R on guide rails 210 and on adapter elements 116, respectively. Sensor 240 detects the presence or absence of a smoking rod on guide rails 210, whereas sensor 242 detects the absence or presence of a smoking rod R on adapter elements 116 at the upper operating ends of cylinders 110b at a point on their pat way, when moved from the lower to the upper position.

Furthermore, two blocking elements 250 are arranged at the lower ends of guide rails 210. Stopper elements 250 include a piston/cylinder arrangement comprising a piston in the form of a pin 252, which is reversibly moveable in a direction vertically to guide rails 210 and into the path way of smoking rods R when sliding along guide rails 210.

Separation device 10 comprises four transportation wheels 70 attached to the bottom side of housing 20 in the region of its four corners formed by the frame elements of the separation device 10. Transportation wheels 70 allow separation device 10 to be moved to the hanging line when starting the production and to be moved away from said hanging line at the end of the production or in case of failure. Wheels 70 may comprise breaking means, e.g. known wheel breaks, for arresting separation device 10 in a predetermined position relative to the hanging line.

For delivering separated smoking rods R to a hanging line for storing sausage-shaped products thereon, separation device 10 is positioned to the hanging line. Thereby rear wall 24 of separation device 10 faces the hanging line. Second ends 214 of guide rails 210 are aligned to a receiving unit of the hanging line for receiving the separated smoking rods R.

It has to be understood, that all drives and sensors of separation device 10 are coupled to a control unit of the production line for producing sausage-shaped products or at least to a control unit of the hanging line for being controlled depending on the production steps of the production line or the storage process the hanging line.

Before starting the production of sausage-shaped products or the storage process of the hanging line, respectively, a plurality of smoking rods R is fed in feeding direction F into storage space 50 of separation device 10 via feeding opening 30 in front wall 22.

For separating a single smoking rod R out of the plurality of smoking rods R stored in storage space 50, telescopic operating devices or piston/cylinder drives 110 are activated. Thereby, cylinders 110b are moved vertically upwardly from their lower or non-operating position into their upper position in discharge direction D. Adapter elements 116 attached to the upper operating ends of cylinders 110b are guides through openings 60 in the tip of V-shaped storage space 50 and further upwardly towards first ends 212 of guide rails 210.

As mentioned above, the upper surfaces of adapter elements 116 correspond to the cross section of smoking rods R. While being moved through the plurality of smoking rods R, an arbitrary single smoking rod R engages adapter elements 116 and is moved upwardly out of the plurality of smoking rods R in discharge direction D. By further moving upwardly said separated smoking rod R held by adapter elements 116, the smoking rod R abuts transfer elements 220. Transfer elements 220 are pivoted upwards by smoking rod R into their transfer position. After smoking rod R is moved into its uppermost position, in which he has passed transfer elements 220, transfer elements 220 pivots back by the force of gravity into the standby position. In this position, transfer elements are placed below separated smoking rod R held by adapter elements 116.

After separated smoking rod R has reached its uppermost position above transfer elements 116, cylinders 110 are moved downwards into their lower or non-operating position. On their way down, adapter elements 116 release separated smoking rod R to transfer elements 116 via which smoking rod R is guided to guide rails 210.

Since guide rails 210 are inclined towards their second ends 214, smoking rod R slides along guide rails 210 in the direction to their second ends 214 whereby a movement of smoking rod R in a direction along its longitudinal axis is restricted by leading elements 230.

Pins 252 of stopper elements 250 attached to the second ends 214 of guide rails 210 are moved into the path way of smoking rod R, thereby stopping smoking rod R at the second ends 214 of guide rails 210. In case that a separated smoking rod R is needed in the hanging line, pins 252 of stopper elements 250 are moved out of the path way of smoking rod R for releasing smoking rod R to the hanging line.

Simultaneously or subsequently to the transferring of separated smoking rod R to the hanging line, one or more further smoking rods R may be separated and delivered to the hanging line or at least to second discharge unit 200. Guide rails 210 of second discharge unit 200 thereby may be act as an intermediate storage space for storing a determined number of smoking rods R. By reaching this predetermined number of smoking rods R on guide rails 210, which may be detected by sensor 240, first discharge unit is stopped.

While smoking rod R is moved upwardly by first discharge unit 100, it passes sensor 242 attached to guide rails 210. Sensor 242, which may include two sensing elements for independently sensing the presence or absence of a smoking rod R at both adapter elements 116 may detect various operating conditions. In a first condition, a smoking rod is held by both adapter elements. In this case, the separation of said smoking rod is continued. In a second case, only one adapter element has caught a smoking rod R. To avoid further trouble by tilting said smoking rod R, the separation step is stopped and cylinders 110b are moved downwardly into their lower position. In a third case, if no smoking rod is detected, the separation step is also stopped and cylinders 110b are moved downwardly into their lower position.

In case of the absence of a smoking rod R, the upward movement of first discharge unit 100 is interrupted and first discharge unit 100 is moved back into its lower position or at least below openings 60 for starting a new separation step.

Furthermore, while smoking rod R is sliding along guide rails 210 of second discharge unit 200, said smoking rod R passes sensor 24 which detect the presence or absence of a smoking rod R on guide rails 210. If no smoking rod R is detected by sensor 240 after a separation action of first discharge unit 100, a signal may be transmitted to a respective control unit for starting a new separation step of first discharge unit 100.

Smoking rods R according to FIGS. 1 and 2 have an approximately triangular cross section including three radial extending fillets. Naturally, smoking rods R may have any other suitable cross section like a circular or squared cross section. Accordingly adapter elements 116 having a triangular shape may be exchanged by adapter elements having a shape corresponding to the cross section of the smoking rods R to be separated in separation device 10.

First and second wall elements 52, 54 according to FIGS. 1 and 2 include recesses for allowing an easy removal of smoking rods R from storage space 50. Each of first and second wall elements 52, 54 may also constitute of two separate segments with a respective recess therebetween.

Storage space 50 described as comprising first and second wall elements 52, 54 arranged in a V-shape. Each of wall elements 52, 54 may also be formed by at least one, preferably by two or more bars arranged in V-shape.

As also described above, first and second wall elements 52, 54 compassing an obtuse angel. First and second wall elements 52, 54 may also compass any other suitable angle like an acute angle. It has to be assured, that smoking rods R may be shifted towards the lower edge or tip of V-shaped storage space 50 by the force of gravity.

In a specific embodiment of the separation device, it is possible to the housing to comprise only one opening acting as feeding opening and as discharge opening. Moreover, to allow an easy access to the storage space and/or to the discharge units, the housing for the separation device may be omitted.

The drives for the first discharge unit have been described as comprising piston/cylinder assemblies. It is also possible to use any other drive for acting said discharge device, like electric, hydraulic or pneumatic drives.

Moreover, additional sensors may be positioned along the path way of the separated smoking rod R when being moved by the first discharge unit 100 into its uppermost position. Said additional sensors may sense the presence or absence of a smoking rod R on adapter elements 116. In case that no smoking rod R has been separated, the movement of first discharge unit may be stopped at an early stage. Additionally, a signal may be sent to an operator for checking the charging level of storage space 50.

The guide rails of the second discharge unit may include conveyor devices like chain or band conveyors for delivering a smoking rod from the first discharge unit to the hanging line.

As described above, stopper elements 250 are attached to the second ends 214 of guide rails 210 to control the transfer of smoking rods to the hanging line. Alternative delivery devices may be coupled to the second ends 214 of guide rails 210. Said alternatively transfer devices may also be activated or controlled independently from separation device 10 or second discharge unit 200.

Separation device 10 has been described as being positioned in an alignment to the receiving unit of the hanging line while smoking rods R are fed to separation device 10 via feeding opening 40, and separated smoking rods R are transferred to the hanging line. Naturally, it is possible to remove separation device 10 positioned at the hanging line when storage space 50 is empty, and to replace said separation device 10 by another separation device with a loaded storage space 50.

Separation device 10 may have any other transportation means than transportation wheels 70, e.g. a separate transportation device. Separation device 10 may also include an own drive like an electric motor to be moved to or away from a hanging line. In case of a stationary use of separation device transportation means may be omitted.

The invention claimed is:

1. A separation device for separating a rod-like element, like a smoking rod, from a plurality of rod-like elements, like smoking rods, stored in a storage space, comprising:
    a housing configured to enclose an internal storage space thereof;
    a first wall and a second wall arranged in the internal storage space of the housing and having an approximately V-shaped cross section with a V-shaped bottom juncture between the first and second walls to form a central surface section thereof, the storage space being configured for storing a plurality of at least approximately horizontally aligned rod-like elements wherein the housing includes at least a front wall, a rear wall and two side walls, the storage space further having a bottom section and a top section,
    a first opening in the housing to an upper region of the storage space configured for feeding the plurality of rod-like elements to be stored in the storage space, from the top section toward the bottom section of the storage space, in an approximately vertically downwardly directed feeding direction, and
    a first discharge unit configured for discharging a single rod-like element out of the plurality of rod-like elements stored in the storage space, along a moving path through the V-shaped bottom juncture adjacent to the central surface section thereof to generally bisect the V-shaped bottom juncture between the first and second wall elements, in a discharge direction directed at least approximately opposite to the feeding direction in a discharge area being located in the upper region of the storage space in the housing, wherein the first discharge unit is configured for engaging an arbitrary single rod-like element of the plurality of rod-like elements while being moved through the plurality of rod-like elements and configured for moving the arbitrary single rod-like element upwardly out of the plurality of rod-like elements in the discharge direction.

2. The separation device according to claim 1 further comprising:
    a second opening in the upper region of the storage space configured for at least discharging the rod-like element separated by the first discharge unit.

3. The separation device according to claim 2,
    wherein the second opening is arranged opposite to the first opening.

4. The separation device according to claim 1,
    wherein the first discharge unit comprises a pair of telescopic operating devices each having an upper operating end, which is reversibly vertically movable between a lower and an upper position, thereby separating on its way to the upper position one rod-like element out of the plurality of rod-like elements stored in the storage space.

5. The separation device according to claim 4 further comprising:

openings of the V-shaped bottom juncture that are adjacent to the central surface section thereof through which the pair of telescopic operating devices are configured to extend.

6. The separation device according to claim 1, further comprising a second discharge unit aligned to the discharge area of the upper region of the storage space, configured for guiding the separated rod-like element to travel from inside the storage space in the housing to an external position outside of the housing, wherein the second discharge unit comprises two guide rails having first and second ends which are arranged parallel to each other, wherein the first ends of the guide rails are aligned to an upper position of an upper operating end of the first discharge unit.

7. The separation device according to claim 4, further comprising:
at least a first sensor positioned in the region of an upper end of the moving path of the pair of telescopic operating devices.

8. The separation device according to claim 1, further comprising: at least one positioning unit aligned to the moving path of the upper operating end of each of the pair of telescopic operating devices, configured for moving the rod-like element held by the pair of telescopic operating devices into a predetermined position along its longitudinal axis.

9. The separation device according to claim 1, further comprising:
adapting elements configured to attach to an upper operating end of the first discharge unit in order to be adapted to rod-like elements of various cross sections.

10. The separation device according to claim 6, further comprising: a sensor arranged at at least one of the guide rails configured for sensing presence of a rod-like element.

11. The separation device according to claim 6 further comprising:
at least one transfer element arranged at the first ends of the guide rails.

12. A method for separating a rod-like element, like a smoking rod, from a plurality of rod-like elements, like smoking rods, stored in a storage space, the method comprises the steps of:

feeding a plurality of at least approximately horizontally aligned rod-like elements in a downwardly directed and at least approximately vertical feeding direction into a storage space of a housing having outer peripheral walls thereof that form the storage space having an approximately V-shaped cross section with inclined walls in the storage space that are different from the outer peripheral walls and extend at an incline thereto, the inclined walls meeting at a V-shaped bottom juncture therebetween and transversely to each other, the V-shaped bottom juncture having a central surface section to support the rod-like elements thereon, engaging an arbitrary single rod-like element of the plurality of rod-like elements by means of a first discharge unit while the first discharge unit is being moved through the bottom juncture of the transversely extending inclined walls adjacent to the central surface section and the plurality of rod-like elements supported thereon, and discharging the arbitrary single rod-like element out of the plurality of rod-like elements stored in the storage space along a moving path in a discharge direction directed at least approximately opposite to the feeding direction and transverse to the transversely extending inclined walls, into a discharge area in the top region of the storage space by means of a first discharge unit.

13. The method according to claim 12, wherein the step of engaging, the first discharge unit moves through the plurality of rod-like elements at an intermediate portion of the storage space.

14. The method according to claim 12, wherein the step of engaging, the first discharge unit moves through the plurality of rod-like elements at an intermediate portion of the storage space.

15. The method according to claim 12, further including the step of:
transferring the single rod-like element separated by the first discharge unit to a second discharge unit aligned to the discharge area in the top region of the storage space, configured for discharging the separated rod-like element out of the storage space.

* * * * *

UNITED STATES PATENT AND TRADEMARK OFFICE
CERTIFICATE OF CORRECTION

PATENT NO. : 9,474,287 B2
APPLICATION NO. : 13/102894
DATED : October 25, 2016
INVENTOR(S) : Peter Wiemer et al.

It is certified that error appears in the above-identified patent and that said Letters Patent is hereby corrected as shown below:

In the Claims

Claim 8, Column 11, Line 21, delete "1" insert -- 4 --, therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*